United States Patent [19]

Marsh

[11] 4,083,246
[45] Apr. 11, 1978

[54] FLUID FLOW METER
[75] Inventor: Lawrence B. Marsh, Silver Spring, Md.
[73] Assignee: Marsh-McBirney, Inc., Gaithersburg, Md.
[21] Appl. No.: 772,849
[22] Filed: Feb. 28, 1977
[51] Int. Cl.² .............................................. G01F 1/00
[52] U.S. Cl. ....................................................... 73/227
[58] Field of Search ........................................... 73/227
[56] References Cited
U.S. PATENT DOCUMENTS

| 1,630,134 | 5/1927 | Puccioni | 73/227 |
| 3,638,490 | 2/1972 | Buettner | 73/212 |
| 3,757,576 | 9/1973 | Rolff et al. | 73/227 X |

FOREIGN PATENT DOCUMENTS

| A37,047 | 6/1930 | France | 73/227 |

Primary Examiner—Richard C. Queisser
Assistant Examiner—John P. Beauchamp
Attorney, Agent, or Firm—Lawrence E. Laubscher

[57] ABSTRACT

A fluid flow rate meter is disclosed for measuring the flow of fluid in a partially filled conduit or channel, including an electromagnetic probe adapted for mounting in the conduit below the low water mark thereof to produce a sensed velocity signal, and a liquid height pressure transducer including an air tube having a bubble-producing opening adjacent the probe for generating a liquid height signal that modifies the sensed velocity signal to produce a resultant signal that corresponds with the average velocity of fluid flow, whereby a more accurate measurement of the rate of fluid flow is obtained. The average velocity signal is multiplied with a conduit area signal obtained from the height signal by a function generator circuit which takes into account the maximum diameter of the conduit (or maximum height of the channel). A percent flow signal is modified by a second function generator in accordance with the area of the conduit.

18 Claims, 23 Drawing Figures

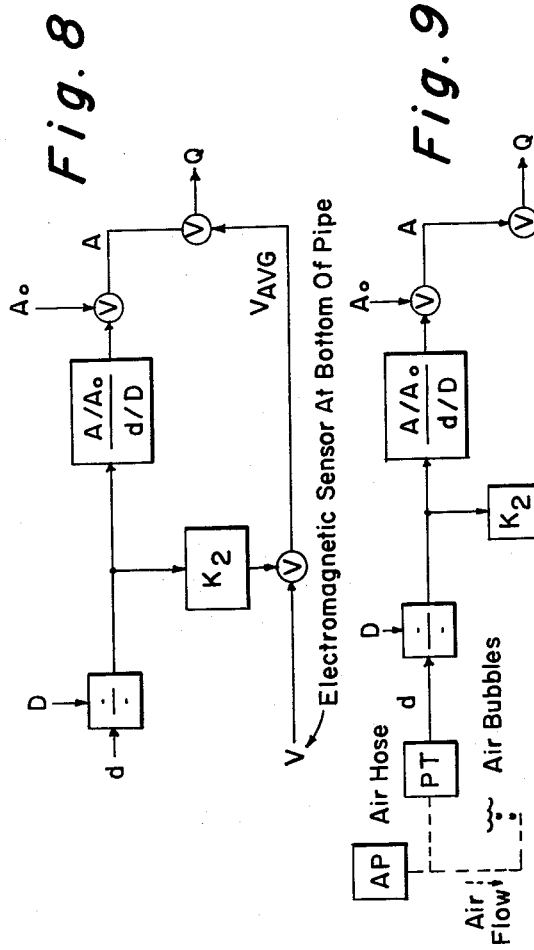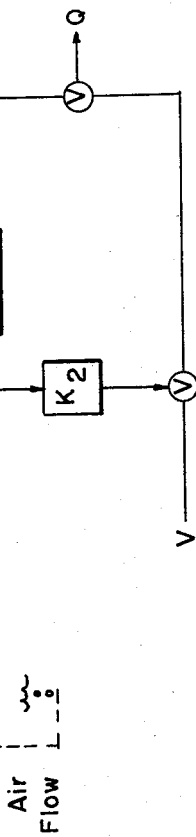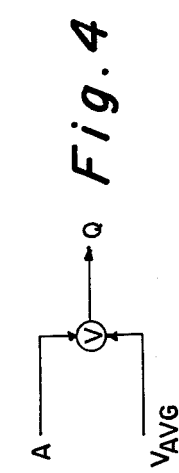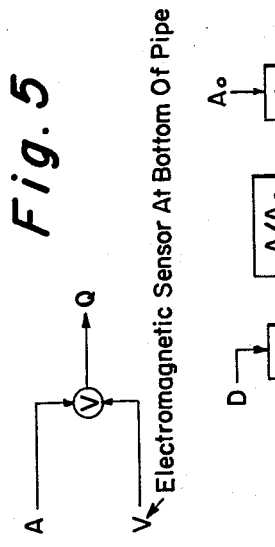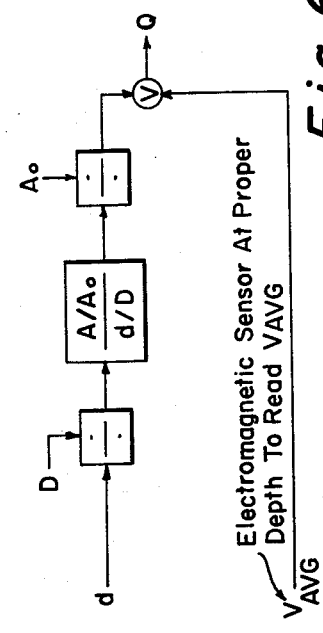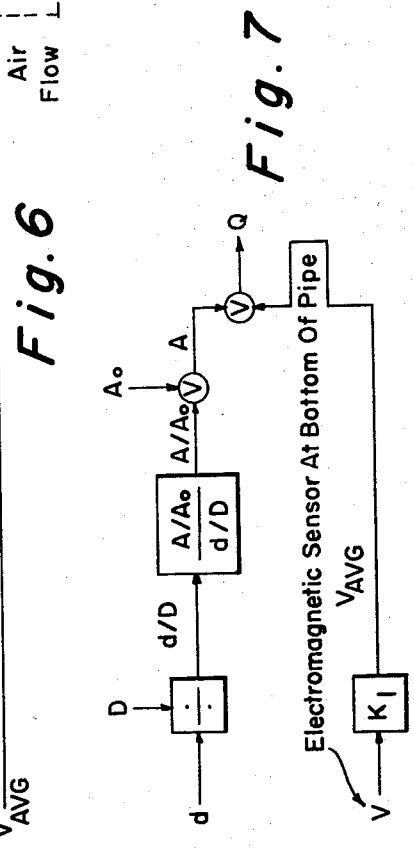

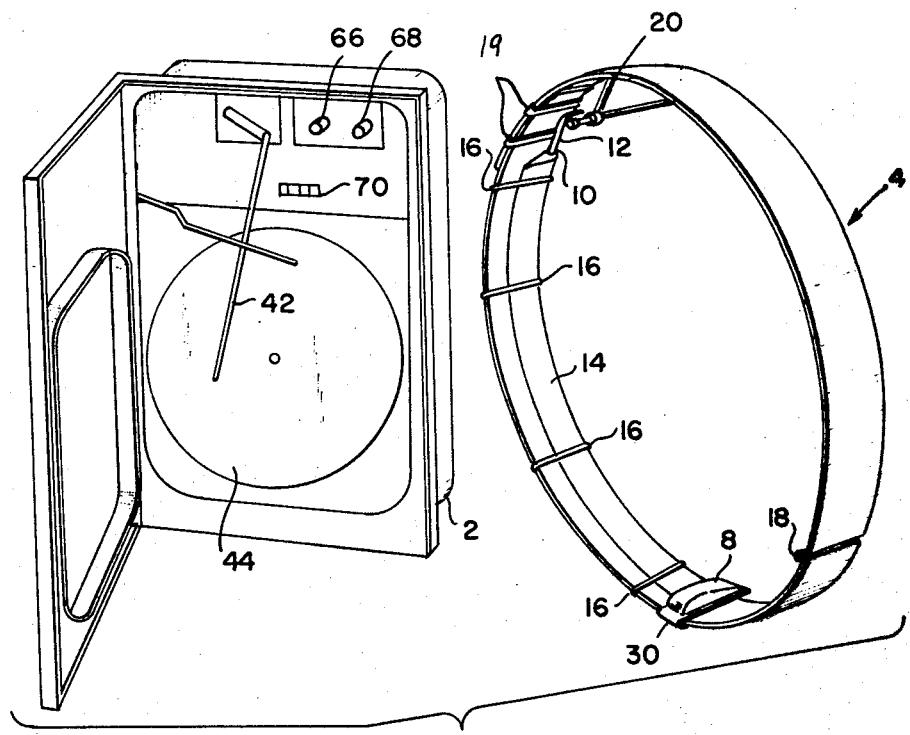
Fig. 12
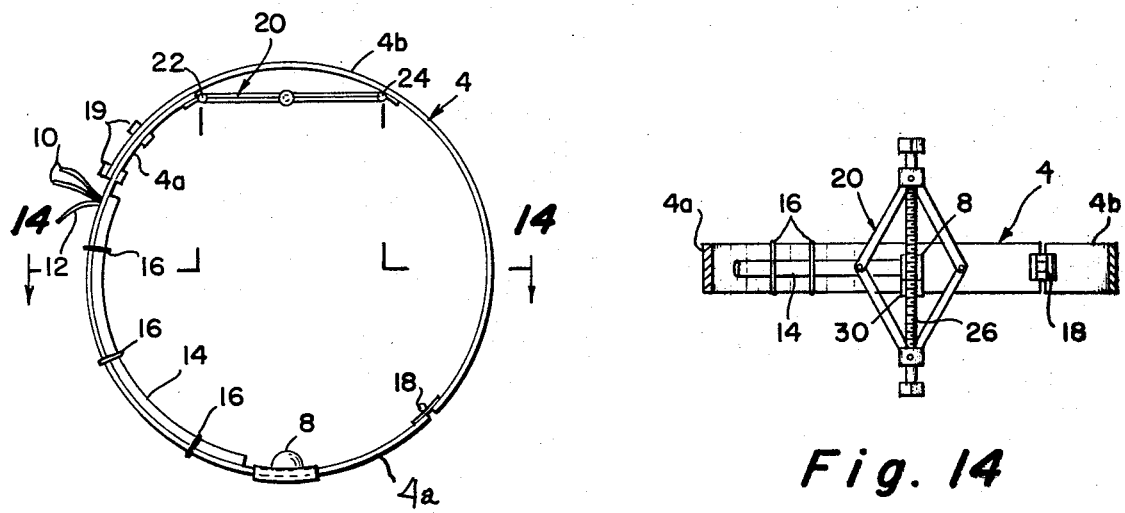
Fig. 13
Fig. 14
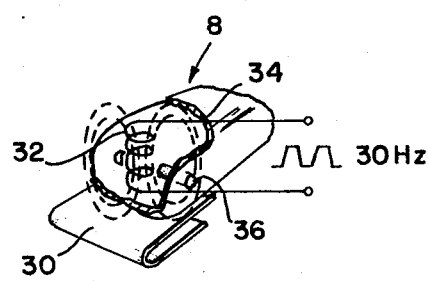
Fig. 15

FLUID FLOW METER

BRIEF DESCRIPTION OF THE PRIOR ART

Recent water pollution control legislation and the need for a closer accounting of sources of water flowing within municipal sewage and storm conduits have produced a need for a more accurate measurement of water flow. Presently, various schemes are employed to give an indication of the flow rate contained in open channel flows such as found in municipal and industrial conduits. An open channel flow measurement differs from a closed conduit flow in that the area of a partially filled pipe is constantly changing whereas the area of a closed, filled conduit is a known fact.

As evidenced by the prior U.S. patents to Sellman et al No. 3,780,578 and Buettner Nos. 3,638,490 and 3,727,459, it is well known in the art to provide fluid flow measuring apparatus for measuring the rate or volumetric flow of fluid in a conduit or channel. In the Buettner Pat. No. 3,638,490, a pair of air bubble tubes are arranged in a conduit for measuring fluid depth and velocity to afford means for measuring fluid flow. Liquid depth gauges of the air bubble type are disclosed by the U.S. patents to Glassey No. 3,475,959 and Kapteyn No. 3,587,316, and flow measuring devices using electromagnetic probes are disclosed in the U.S. patents to Marsh No. 3,885,433, Darby No. 3,898,881, Sturgeon No. 2,949,551, Rolff et al No. 3,757,576 and Banks No. 3,802,262.

These known measuring systems have various inherent drawbacks which affect the accuracy of flow measurement. For example, in a partially filled conduit or channel it is difficult to measure the average velocity of fluid flow, since the velocity varies at different cross-sectional locations as a function of the configuration of the conduit as well as the varying heights of the liquid (in accordance with tides, sewage production, weather conditions and the like). While it is conventional to mount the probe devices in the bottom of the conduit in order to maintain them free from debris in the fluid, the velocity which is sensed at this location is not accurately related to the true velocity of the fluid flowing in the conduit.

The present invention was developed to avoid the above and other drawbacks of the known fluid flow measuring apparatus.

SUMMARY OF THE INVENTION

The present invention was developed to provide a volumetric flow meter which records true volume flow without the necessity of empirical equations, is easily installed in existing conduits or channels, and is unaffected by diluted acids or suspended solids. The apparatus is capable of monitoring reverse flows, and will maintain its accuracy of measurement in surcharge conditions using linear sensor means. Furthermore, the accuracy of measurement is independent of pipe slope and interior roughness, and is suitable for use with either an alternating-current or direct-current power supply.

Accordingly, a primary object of the present invention is to provide a fluid flow rate measuring device including means including a probe submerged in the liquid for producing an average velocity signal, means for producing a fluid height signal which corresponds with the instantaneous height of the fluid in the conduit, transfer function means for converting the fluid height signal to a fluid means signal, and means for multiplying the average velocity signal of the the fluid area signal to produce a fluid flow rate signal that is supplied to indicating means such as a recorder.

In accordance with a more specific object of the invention, the average velocity signal is obtained from a local velocity signal obtained from a streamlined electromagnetic probe which is mounted in the bottom of the conduit, said local velocity signal being modified by a signal which is a function of the liquid height. More particularly, the liquid height signal is modified by modifying mean which are selectively operable in accordance with the diameter of conduit (or maximum height of the open channel) to produce a percent level signal which is multiplied with the sensed velocity signal to produce the average velocity signal. The percent level signal, in turn, is modified by function generator means to take into account the cross-sectional configuration of the conduit (i.e., circular, rectangular, polygonal, or the like).

In accordance with a further object of the invention, the area signal is obtained from the percent level signal by function generator means which also take into account the cross-sectional configuration of the conduit. More particularly, the function generator means is operable between a first position which takes into account the generally S-shaped area versus height curve of a circular pipe, and a second position which takes into account the linear relation between area versus height for a rectangular conduit.

According to a further object of the invention, a percent area signal obtained from the height signal by the function generator means is selectively modified in accordance with conduit area to produce a true flow rate signal that is supplied to the indicating means. In the illustrated embodiment, the signal modifying means for selectively obtaining the percent level signal and the signal modifying means for selectively obtaining the area signal include selected resistors corresponding to the size and configuration of the apparatus which are mounted on a plug-in module for electrical connection with the flow measuring instrument. In the alternative, variable resistance means or resistance bank switching means may be provided for adjusting the two integrator means to correspond with conduit size and shape.

A further object of the invention is to provide improved expansible clamp means for mounting the probe and the air bubble tube in a existing conduit.

The present invention has utility in inflow and infiltration studies, monitoring of industrial or municipal effluent for Environmental Protection Agency permits, permanent or portable monitoring of wastewater in municipal systems, influent and effluent treatment plants, filled or partially filled pipe flow, conduits leading into or out of lift stations or catch basins, and industrial process water.

BRIEF DESCRIPTION OF THE DRAWING

Other objects and advantages of the invention will become apparent from a study of the following specification when viewed in the light of the accompanying drawing, in which:

FIGS. 4-10 are block diagrams for explaining the operation of the water flow measurement of the instant invention;

FIG. 12 is a perspective view of the flow measuring apparatus of the present invention;

FIG. 13 is an end elevation view of the clamp means for mounting the probe in a conduit;

FIG. 14 is a sectional view taken along line 14—14 of FIG. 13;

FIG. 15 is a perspective view of the electromagnetic probe; and

DETAILED DESCRIPTION

Figure 1A:
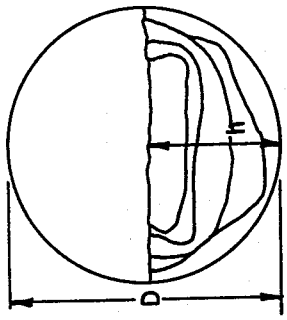
FIGS. 1A and 1B illustrate the velocity contour of a fluid flowing in a partly filled circular conduit.
Figure 1B:
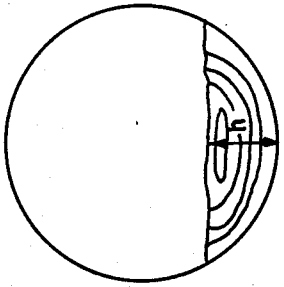
Figure 1C:
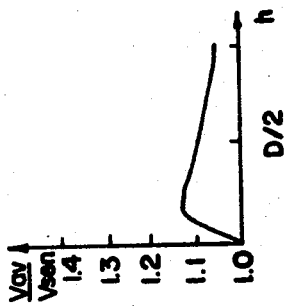
FIG. 1C is a graph illustrating the relationship between average velocity and sensed velocity (taken at the bottom of the conduit) for various fluid heights.

Referring first more particularly to FIGS. 1A-1C, it will be apparent that the velocity contour of a fluid, such as water, flowing in a partially filled pipe or conduit having a circular cross-section varies as a function of the height of the fluid. In FIG. 1C, the relationship between average fluid velocity to the velocity sensed by a probe arranged at the bottom of the conduit has been plotted versus fluid height. FIGS. 2A-2C and 3A-3C illustrate corresponding illustrations for fluid flowing in partially filled conduits of rectangular and polygonal cross-sectional configurations, respectively. As can be seen, the relationship between average velocity and sensed velocity varies for various pipe shapes and water levels in a complex manner. Although a simple first order correction that does not rely upon a variation in water height can be made, the accuracy of such a device is far less than may be achieved with a velocity reading which has been modified as a function of water depth.

In order to understand the mathematical background of the present invention, reference is now made to the illustrative block diagrams of FIGS. 4-10.

FIG. 4 illustrates that in a partially filled pipe, (be it rectangular or circular) the volumetric flow, Q, is equal to the average velocity times the area of the partially filled pipe.

FIG. 5 represents the implementation of FIG. 4 where the velocity sensor is an electromagnetic type velocity sensor.

FIG. 6 indicates how the flow area measurement is achieved by means of a depth sensor. The depth, $d$, is divided by the diameter of the pipe and is then put through a transfer function (a simple mathematic conversion of water height to area) and then is multiplied by the average velocity that is detected by an electromagnetic sensor. The average velocity of FIG. 6 is obtained by placement of the electromagnetic sensor (or any velocity sensor) at such a position that it always measures the average velocity. This can only be achieved by making the position of the velocity sensor variable.

FIG. 7 represents the same basic configuration as FIG. 6 with the sole exception that the velocity sensor is placed at the bottom of the pipe (or at some other fixed location) and a constant correction factor $K_1$ is inputted so as to change the sensed velocity to an average velocity that is correct at the most typical depth of flow in the pipe. Therefore, the flow will be accurate most of the time but will deviate from being correct at levels that vary considerably from the "typical" depth.

FIG. 8 represents a block diagram that is similar to FIG. 7 but the sensed velocity of the fixed sensor is changed to average velocity by means of a correction factor $K_2$ that is variable with the ratio of depth to diameter of the pipe. Thus, a continuous correction can be made to the sensed velocity and the average velocity will represent more nearly the average velocity at all water depths.

FIG. 9 is a special implementation of FIG. 8 where the depth transducer consists of an air pump and the bubbler tube that is connected to a pressure transducer to yield a signal that is proportional to pressure and hence water depth.

FIG. 10 is a further implementation of FIG. 9 where a rate converter feedback loop is provided so that when large and rapid changes in water level occur the pump will increase its rate so as to be able to rapidly follow these changes. Otherwise, at a slow pump rate (to provide long battery life) the instrument would read a much lower pressure and hence, level, than would actually exist. If, however, the pump rate is speeded up as it senses rapid change, the instrument will be much more accurate.

Referring now to FIGS. 11-15, the apparatus of the present invention includes an instrument housing 2 that is adapted for mounting adjacent a conduit (for example, in the man-hole access opening), clamp means 4 adapted for mounting concentrically within a conduit 6 upstream from the man-hole access opening, electromagnetic probe means 8 mounted upon the bottom portion of the clamp means 4, a pair of conductors 10 that electrically connect the probe 8 with the instrument, and a pair of air tubes which extend from the instrument housing and join into a single tube 12 which terminates at its free end in an opening arranged at the bottom of the clamp means adjacent the electromagnetic probe 8. The portions of the conductors and the air tube within the clamp means are enclosed in a synthetic plastic sheath 14 that is banded or tied against the inner surface of one side of the clamp means by tie means 16.

Figure 11:
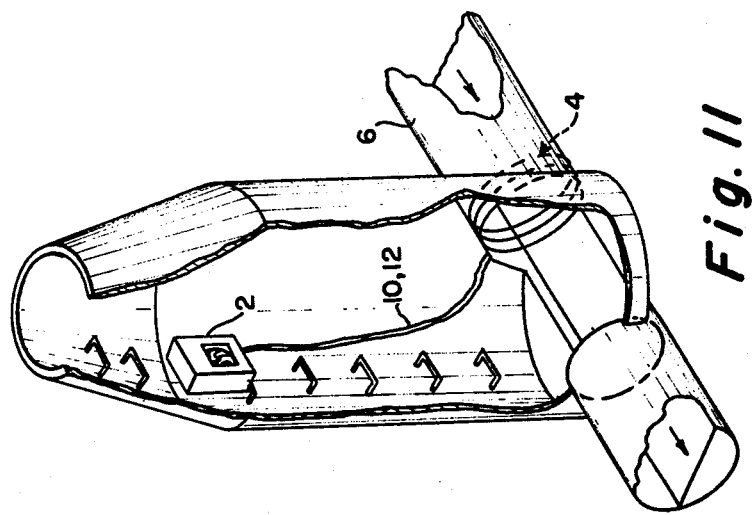
FIG. 11 is a perspective view illustrating the manner of mounting the fluid flow measuring apparatus in a storm conduit.
Figure 3A:
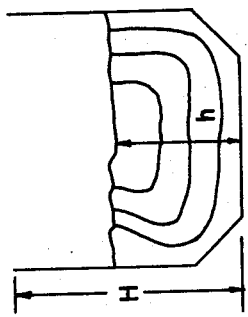
FIGS. 2A-2C and 3A-3C are corresponding illustrations for rectangular and polygonal cross-sectional conduit configurations, respectively.
Figure 3B:
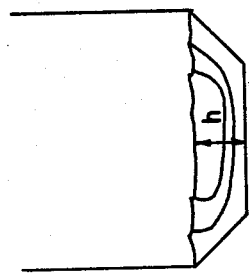
Figure 3C:
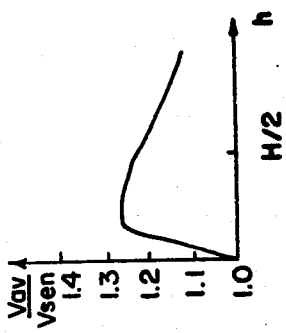
Figure 2A:
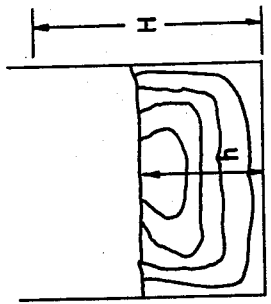
Figure 2B:
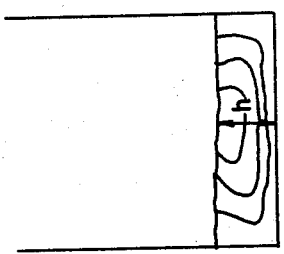
Figure 2C:
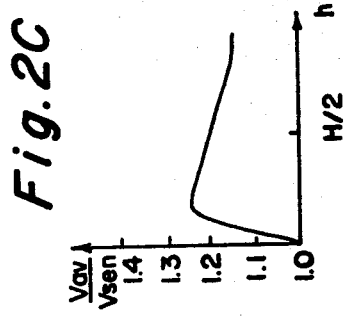

As shown in FIG. 13, the clamp means 4 includes a pair of resilient, generally semi-circular sections 4a and 4b that are hingedly connected together at one end by hinge means 18. At their other ends, the section 4b extends in slidably guided relation about the adjacent end of section 4a, a pair of bands 19 being secured to the section 4b for encircling the sections to prevent relative lateral displacement of the overlapping section ends. In accordance with an important feature of the invention, expansible scissors linkage means 20 are pivotally connected between the extremity of clamp section 4a and an intermediate location on clamp section 4b by pivot means 22 and 24, respectively, said scissors means being operable by bolt 26 to expand the clamp means into tight engagement with the inner circumference of the upstream conduit section 6, as shown in FIG. 11.

The electromagnetic probe 8, which is mounted on the clamp section 4a by the resilient U-shaped clamp 30, is of the single-axis type known in the art. The probe includes a coil 32 which is encased in the streamlined debris-resistant synthetic plastic housing 34, and a pair of laterally extending electrodes 36 the remote ends of which extend through opening contained in housing and terminate flush with the housing external surface.

Figure 16:
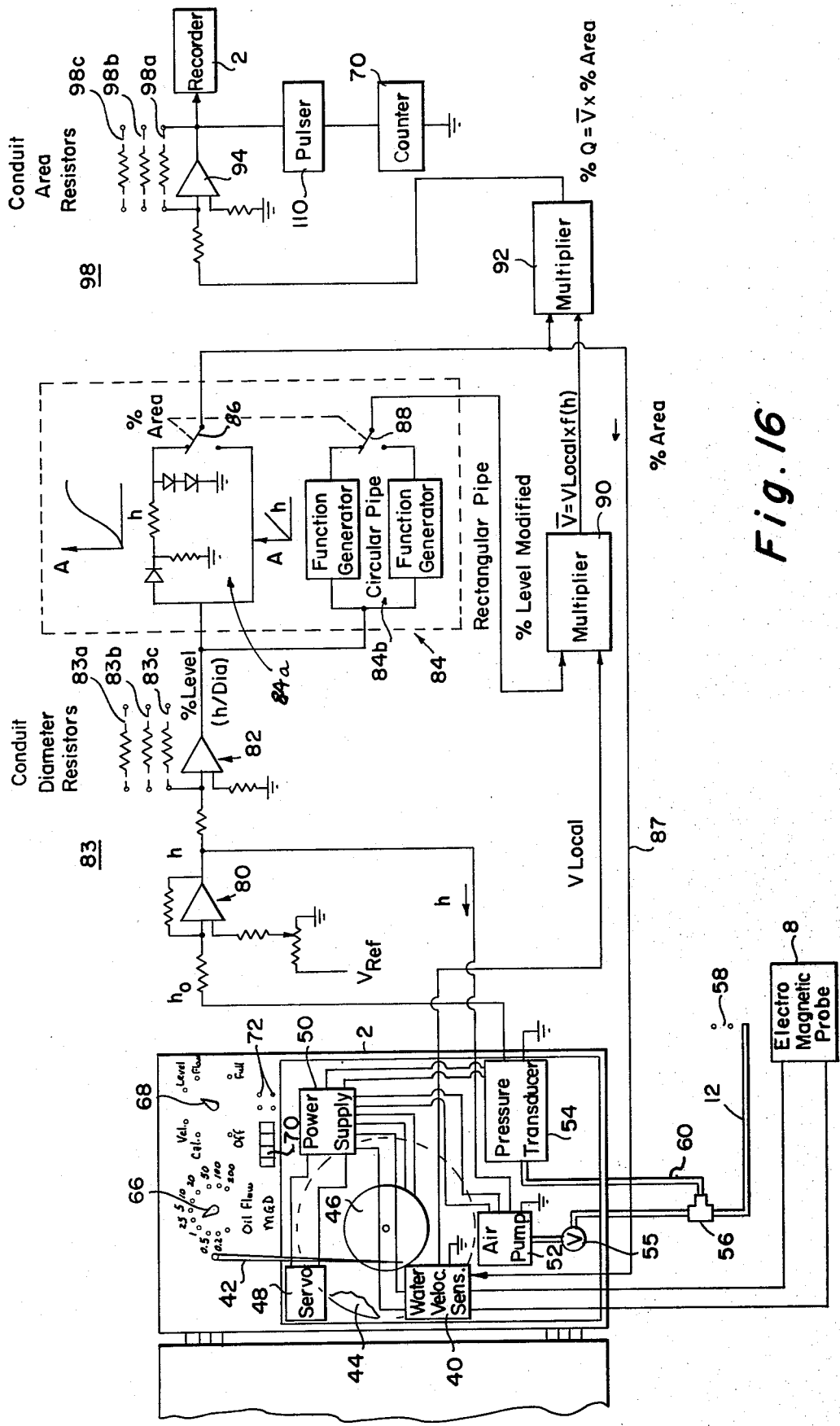
FIGS. 16 and 17 are somewhat diagrammatic electrical schematic diagrams of the velocity modified flow meter of the present invention.

As is conventional, the coil is supplied with a square wave signal (such as a 30 $H_z$ signal) supplied by the water velocity sensing means 40 (FIG. 16).

As shown in FIGS. 12 and 16, the recorder housing 2 includes a pivotally movable recording pen 42 which is operable to record desired readings on the chart 44 that is rotatably driven by clockwork means 46. The details of the recording means are known in the art and accordingly will not be described in detail. One example of a suitable recording device is the Bristol Recorder Model No. 4331-10C. The servo 48 of the recording device is supplied with power from the power supply 50, which power supply also supplies power to the water velocity sensor device 40, the air pump 52 and the pressure transducer 54. The air pump supplies air to the free end of conduit 12 via valve 55 and Tee-connector 56, the terminal portion of conduit 12 being secured to the clamp means adjacent the electromagnetic probe in the bottom of the conduit 6 for emitting air bubbles 58 into the fluid.

The pressure transducer 54 is connected with the cross branch of the Tee-connector 56 via conduit 60 for measuring the fluid pressure in conduit 12, thereby to give an indication of the height of the fluid in the conduit 6. Such pressure transducer devices are well known in the art, one example being the Robinson Halpern Pressure Transducer Model No. K 150-016. Similarly, the water velocity sensor device is of the phase-sensitive type in which the applitude and phase shift of the square wave signal supplied to the probe 8 is measured to indicate the velocity of the fluid in conduit 6. One example of such water velocity sensing devices is the Marsh-McBirney, Inc. velocity sensing meter Model 201.

Also mounted in the recorder housing 2 are a flow range switch 66 that is adjustable between positions corresponding to measured flow rate ranges of 0.1, 0.2, 0.5, 1, 2.5, 10, 20, 50, 100 and 200 million gallons per day, a recorder condition switch 68 that is adjustable between off, calibration, velocity, level, flow and full pipe positions, respectively, and a counter 70. Furthermore, the recorder is provided with four female jacks 72 by means of which a suitable pipe diameter plug-in module 74 (FIG. 17) may be physically and electrically connected as will be described in greater detail below.

As shown in the simplified explanatory diagram of FIG. 16, the liquid height signal $h_o$ from the pressure transducer 54 is supplied to the first amplifier stage 80 having a reference voltage offset, thereby shifting the measured height signal $h_o$ to produce the absolute height signal $h$ which is fed to the second amplifier stage 82, and to the air pump 52, thereby to adjust the speed of operation thereof. Associated with the second amplifier stage 82 are a pair of terminals across which may be connected one of a plurality of conduit diameter resistors 83a, 83b, 83c the resistance values of which correspond with various pipe diameters, respectively. By inserting the appropriate resistor corresponding with the average (or effective) diameter of the conduit 6, the signal appearing at the output of amplifier stage 82 will be equal to $h$/Dia (i.e., "% LEVEL"). This signal is then supplied to the function generator stage 84 which includes a first arm 84a which modifies the % LEVEL signal to produce a "% AREA" signal in accordance with conduit configuration, and a second arm 84b which modifies the % LEVEL signal in accordance with conduit configuration. Switch 86 is operable between a first position operable to modify the % LEVEL signal in accordance with S-shaped area versus height curve of a circular conduit, and a second position corresponding to the linear relation between area and height for a rectangular pipe. Switch 88, which is ganged to switch 86, similarly modifies the % LEVEL signal in accordance with conduit configuration.

The local velocity signal produced by the electromagnetic probe 8 mounted between the low water mark and the bottom of the conduit and by the water velocity sensor electronics 40 and the configuration modified % LEVEL signal from switch 88 are multiplied by multiplier 90 to produce a modified velocity signal which is multiplied with the % AREA signal from switch 86 by multiplier 92, thereby to produce a signal proportional to flow rate Q divided by pipe diameter. While for purposes of explanation the multiplier 92 has been illustrated as being a separate component, in the preferred embodiment it is incorporated in the water velocity sensor electronics as shown diagrammatically in FIG. 17. This signal in turn is supplied to a further amplifier stage 94 which is provided with a pair of terminals across which is connected a predetermined one of a plurality of conduit area resistors 98a, 98b, 98c the resistance values of which correspond with various conduit areas, respectively, thereby to produce at the output of the amplifier stage 94 a FLOW signal that is supplied to the recorder 2 and to the counter 70.

Figure 17:
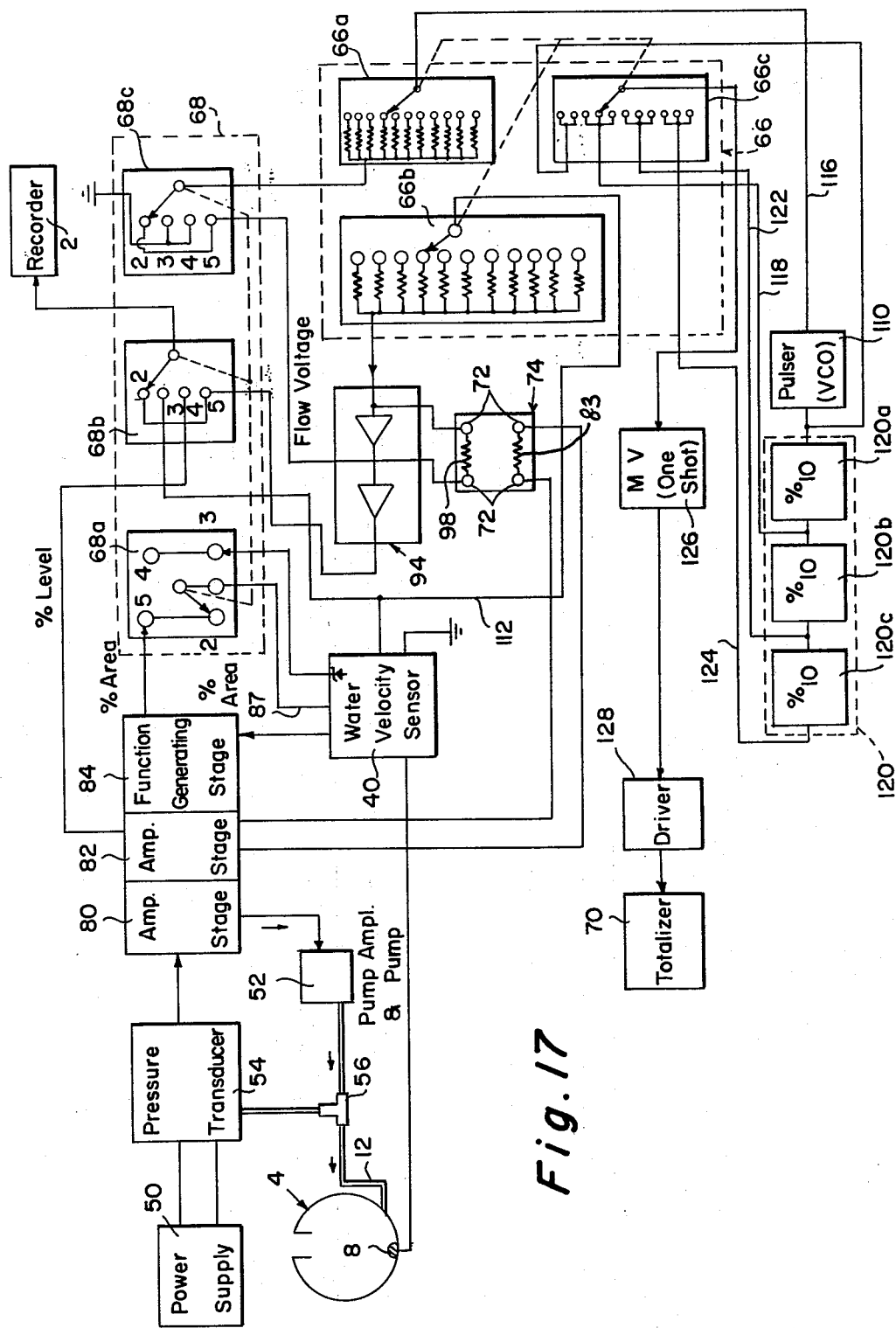

Referring now to the more detailed diagram of FIG. 17, it will be seen that the selected plug-in module 74 which is selectively connected with the female jacks 72 of the recorder carries the predetermined pipe diameter and pipe area resistors 83 and 98, respectively, which correspond with the size and configuration of the conduit 6 with which the apparatus is being used. The recorder condition switch 68 includes three ganged multi-position switches 68a, 68b and 68c only four stationary contacts of which are shown (the OFF and CALIBRATION contacts having been omitted for clarity). Thus, contacts 2, 3, 4 and 5 correspond to the FLOW, VELOCITY, LEVEL and FULL PIPE switch positions of FIG. 16. The stationary contacts 2 and 5 of switch 68a are connected with the % AREA output terminal of function generator stage 84, the stationary contacts 3 and 4 are connected with a reference voltage terminal of the water velocity sensor 40, and the movable switch contact is connected with a control terminal of the water velocity sensor for controlling the power supplied to, and consequently the strength of the magnetic field produced by, the probe 8.

Recorder condition switch 68b includes a movable contact that is connected with the recorder 2, jumpered stationary contacts 2 and 5 to which the flow signal is supplied from amplifier stage 94, a stationary contact 3 to which the velocity signal is supplied from water velocity sensor 40, and a stationary contact 4 to which the % LEVEL signal is supplied from the second amplifier stage 82. Finally, recorder condition switch 68c includes jumpered stationary contacts 2 and 5 connected with an intermediate stage of amplifier means 94, stationary contacts 3 and 4 connected with ground, and a movable contact connected with the resistors of flow range resistor bank 66a having a movable contact connected with the voltage controlled oscillator pulser 110. Range resistor bank 66b has a movable contact to which the velocity signal is applied via conductor 112, the resistors of this bank being connected with the input of amplifier stage 94. Finally, range resistor switch 66c has jumpered groups of stationary contacts (the number of which corresponds to the number of range bank resistors), the first group being connected with the output of the pulser 110 by conductor 116, the second group being connected by conductor 118 with the output of the first stage 120a of multi-stage divider circuit 120, the third group being connected by conductor 122 with the output of second divider stage 120b, and the fourth group being connected by conductor 124 with the output of third divider stage 120c. The movable contact of switch 66c is connected with the input of one-shot multivibrator 126 the output of which is connected with the driven means 128 of the totalizer 70.

OPERATION

Assuming that the recorder condition switch 68 is in the FLOW position, that the flow range switch is in the 1 million gallons per day position, and that the clamp means 4 is clamped in the upstream side of the conduit 6 with the probe 8 arranged adjacent the bottom of the conduit, air is pumped by pump 52 into conduit 12 and is discharged in the fluid as bubbles adjacent the probe 8. The pressure measured by pressure transducer 54 to generate a signal as a function of the height of the fluid in the conduit, which signal is transmitted to the first amplifier stage 80. The height signal $h_o$ is added to the reference voltage to produce the absolute height signal $h$ (when the bubble tube is not at absolute bottom) which is supplied to the input of second amplifier stage 82 and is also supplied to the air pump 52 to control the speed of operation thereof as a function of fluid height. The height signal is modified by amplifier stage 82 to provide a % LEVEL signal ($h$/Diam.). This modification is determined by the selected conduit diameter resistor 83 provided on the plug-in module 74 which corresponds with the diameter of the conduit 6. The % LEVEL signal is modified by the function generator circuit 84 in accordance with the specific configuration (i.e., circular or rectangular) of the conduit and is supplied to the multiplier 90 to modify the velocity signal produced by the water velocity sensor electronics 40 and the probe 8 arranged in the conduit 6 below the low water mark, which modified velocity signal is supplied to one input of the multiplier 92. The % LEVEL signal is modified by the function generator circuit 84a to produce a % AREA signal which is supplied to the other input of multiplier 92. The modified velocity and % AREA signals are multiplied by multiplier 92 to produce a % FLOW signal which is changed by amplifier 94 to produce the FLOW signal as modified by the appropriate conduit area resistor 98 (on plug-in module 74) in accordance with the total area of the conduit 6. As shown in FIG. 17, the FLOW signal is supplied to recorder 2 via switch 68b, thereby to record the appropriate information on recorder chart 44, and is also supplied to the voltage controlled oscillator pulse source 110 via the selected resistor of the bank of range resistors 66a. Pulses from the divider circuit 120 are supplied to the one-shot multivibrator via conductor 118 and switch 66c, thereby to drive the counter 70.

In order to check the water velocity signal, recorder switch 68 is switched to the VEL (contact 3) position, whereupon the velocity signal from water velocity sensor means 40 is supplied to the recorder via switch 68b, the resistor bank 66a being connected with ground via switch 68c. To check the operation of pressure transducer 54, recorder condition switch 68 is placed in the LEVEL (contact 4) position, whereupon the % LEVEL signal is supplied to recorder 2 via switch 68b, and resistor bank 66a is connected with ground. Finally to operate in FULL PIPE CONDITION, recorder condition switch 68 is placed in the FULL (contact 5) position, whereupon the output from amplifier stage 94 is supplied to the recorder via switch 68b.

It is apparent that instead of using a plug-in module 74, multi-position switch means could be provided for selectively connecting in the circuit of FIG. 16 the desired circuit diameter resistors 83 and conduit area resistors 98. By mounting the probe 8 at or near the bottom of the conduit 6, the probe 8, owing to its streamlined configuration, is maintained free from debris, but in view of height-modifying input from the pressure transducer 54, an accurate measurement of fluid velocity is achieved by the present invention, whereby a reading that is directly proportional to flow rate is produced. Even if the flow temporarily reverses, such as in tidal regions or in installations where sewage storage techniques are utilized, the velocity modified flow meter will properly measure reverse flow because the instrument actually senses velocity. Thus the instrument measures level and localized velocity so as to depict the average velocity under changing conditions.

The instrument of the present invention allows the user to incorporate pipe size and pipe shape into the instrument so as to automatically make the instrument capable of reading properly under a wide range of pipe sizes and conditions. For instance, the function generator means produces a nonlinear "S" shape function that converts percentage water height to percentage area. For a rectangular channel this block diagram would be a simple linear gain. For an oval shaped pipe, the function would also be "S" shaped but would be different than that for a circular pipe. Thus the instrument is operable so as to change water level into area by means of the appropriate mathematical function. This area is then multiplied by a water level modified velocity so as to depict the average flow obtained from the multiplication of the average velocity times the partially filled pipe area.

In accordance with a further advantage, the instrument can sense when the pipe is full and will not calculate an area larger than the known maximum area of the pipe. Thus, the instrument is capable of operation not only in partially filled pipe conditions, but also in filled pipes.

While in accordance with the Patent Statutes, the preferred form and embodiments of the invention have been illustrated and described, it will be apparent to those skilled in the art that other modifications may be made without deviating from the inventive concepts set forth above.

What is claimed is:
1. Apparatus for measuring the flow of fluid in a conduit, channel or the like, comprising
(a) means mounted in the conduit for producing an average fluid velocity signal, including
(1) a probe;
(2) means for mounting said probe between the low water mark and the bottom of said conduit, whereby said probe produces a local velocity signal; and
(3) means for modifying said local velocity signal to produce said average velocity signal;
(b) means for producing a fluid height signal corresponding to the height of the fluid in the conduit;
(c) transfer function means for converting the fluid height signal to a fluid area signal;

(d) means for multiplying the average fluid velocity signal with the fluid area signal to produce a fluid flow rate signal; and (e) indicator means connected with the output of said multiplier means for producing an indication of the magnitude of said fluid flow rate signal.

2. Apparatus as defined in claim 1, wherein said probe comprises an electromagnetic probe of velocity sensing means.

3. Apparatus as defined in claim 2, wherein said means for modifying said local velocity signal to produce said average velocity signal includes means for modifying said height signal as a function of the maximum height of the conduit to produce a percent level signal, and means for multiplying said local velocity signal by a correction factor which is a function of said percent level signal.

4. Apparatus as defined in claim 3, and further including function generator means for modifying said percent level signal as a function of the cross-sectional configuration of the conduit.

5. Apparatus as defined in claim 3, wherein said means for producing said fluid height signal comprises
(1) an electrically driven air pump;
(2) conduit means connected with said air pump for discharging bubbles of air in the fluid adjacent said electromagnetic probe; and
(3) pressure transducer means connected with said conduit means for generating said height signal as a function of the pressure of fluid in said conduit means.

6. Apparatus as defined in claim 5, wherein the speed of operation of said air pump is controlled as a function of both said height signal and the rate of change of said height signals.

7. Apparatus as defined in claim 3, and further including function generator means for modifying said percent level signal to produce a percent area signal, and further including second multiplier means for multiplying said percent area signal with the height-modified average velocity signal to produce a percent flow rate signal.

8. Apparatus as defined in claim 7, wherein said function generator means is operable to modify said percent level signal in accordance with the cross-sectional configuration of the conduit.

9. Apparatus as defined in claim 7, and further including means for modifying the percent flow rate signal as a function of the area of the conduit to produce said flow rate signal.

10. Apparatus as defined in claim 9, wherein said means for modifying the height signal to produce the percent level signal include first resistor means the resistance value of which correspond with the diameter of the conduit.

11. Apparatus as defined in claim 10, wherein said means for modifying the percent flow rate signal to produce the flow rate signal includes second resistor means the resistance value of which corresponds with area of the conduit.

12. Apparatus as defined in claim 11, wherein said first and second means are mounted on a plug-in module adapted for connection with said indicating means.

13. Apparatus as defined in claim 9, and further including indicator condition switch means for selectively supplying to said indicating means said flow rate signal, said percent level signal, and said average velocity signal, respectively.

14. Apparatus as defined in claim 13, and further including range switch means for varying the range of operation of said indicating means.

15. Apparatus as defined in claim 14, and further including a first resistor bank the resistors of which are selectively connected by said range switch means between said means for producing the flow rate signal and said indicating means.

16. Apparatus as defined in claim 15, and further including a voltage responsive pulse source, means for counting the pulses produced by said pulse source, and means including a second resistor bank for supplying the flow rate signal to said pulse source, the resistors of said second resistor bank being selectively connected by said range switch means, between the means for producing the flow rate signal and said pulse source, thereby to vary the range of the totalizer means in accordance with the operation of said range switch.

17. Apparatus as defined in claim 5, wherein the means for mounting the electromagnetic probe and said air bubble conduit in the fluid conduit includes expansible clamp means.

18. Apparatus as defined in claim 17, wherein said clamp means includes a resilient strap member the ends of which are brought together in overlapping relation to define a generally circular configuration, and scissors means connected between the strap ends for expanding the clamp means into tight engagement with the inner circumferential surface of the conduit.

* * * * *

UNITED STATES PATENT AND TRADEMARK OFFICE
CERTIFICATE OF CORRECTION

PATENT NO. : 4,083,246
DATED : April 11, 1978
INVENTOR(S) : Lawrence B. Marsh

It is certified that error appears in the above—identified patent and that said Letters Patent is hereby corrected as shown below:

Column 2, line 1, change "means" (first occurrence) to:
-- area --;

line 2, change "of the" to:
-- with --;

line 12, change "mean" to:
-- means --;

line 13, after "of", insert:
-- the --;

line 49, change "a" to:
-- an --; and

Column 5, line 29, change "applitude" to:
-- amplitude --.

Signed and Sealed this

Fifteenth Day of December 1981

|SEAL|

Attest:

GERALD J. MOSSINGHOFF

Attesting Officer      Commissioner of Patents and Trademarks